United States Patent [19]

Klose et al.

[11] Patent Number: 5,172,956
[45] Date of Patent: Dec. 22, 1992

[54] HYDRAULIC SYSTEM FOR A MOTOR VEHICLE BRAKE SYSTEM HAVING A PUMP WITH PULSATION REDUCTION

[75] Inventors: Michael Klose, Besigheim; Ernst-Dieter Schaefer, Gerlingen; Frank Schumann, Moeglingen; Gerhard Wetzel, Korntal; Klaus Mueller, Tamm, all of Fed. Rep. of Germany

[73] Assignee: Robert Bosch GmbH, Stuttgart, Fed. Rep. of Germany

[21] Appl. No.: 729,288

[22] Filed: Jul. 12, 1991

[30] Foreign Application Priority Data

Sep. 29, 1990 [DE] Fed. Rep. of Germany ....... 4030862

[51] Int. Cl.$^5$ ............................................. B60T 13/14
[52] U.S. Cl. ........................................ 303/10; 303/87; 303/116.4; 137/68.1
[58] Field of Search .......... 303/10, 11, 116 R, 116 SP, 303/116 PC, 1, 49, 87; 138/40, 41; 137/68.1; 188/317

[56] References Cited

U.S. PATENT DOCUMENTS

| 2,188,761 | 1/1940 | Peterson et al. ................ 138/41 X |
| 2,288,715 | 7/1942 | Karrer et al. ................... 138/41 X |
| 3,123,517 | 3/1964 | Davis ............................. 137/68.1 X |
| 3,704,807 | 12/1972 | Lidgard ......................... 137/68.1 X |
| 4,287,904 | 9/1981 | Kushner et al. ................ 137/68.1 |
| 4,915,363 | 4/1990 | Prozeller et al. .............. 267/64.15 |
| 5,058,961 | 10/1991 | Mergenthaler et al. ........ 303/87 X |

FOREIGN PATENT DOCUMENTS

| 30820 | 6/1981 | European Pat. Off. ........... 137/68.1 |
| 1145881 | 3/1963 | Fed. Rep. of Germany ..... 137/68.1 |
| 1357286 | 12/1987 | U.S.S.R. ........................ 303/116 PC |
| 1590003 | 5/1981 | United Kingdom . |
| 2129518 | 5/1984 | United Kingdom . |

Primary Examiner—Robert J. Oberleitner
Assistant Examiner—Alfred Muratori
Attorney, Agent, or Firm—Edwin E. Greigg; Ronald E. Greigg

[57] ABSTRACT

A hydraulic system having a pressure generator which is protected against destructive overload. The hydraulic system has a pulsating feeding pressure generator, such as a piston pump, which feeds pressure fluid at high pressure into a damper chamber of a housing. A throttle body having a throttle bore is disposed on the outlet side of the damper chamber. For producing the protective effect, the damper chamber is preceded by a rupture disk communicating with the outlet. The throttle body suitably has a thin-walled portion, embodied as a rupture disk, in which the throttle bore is located. The embodiment described is advantageously usable in hydraulic systems in which pressure fluids are pulsatingly fed at high pressures.

16 Claims, 2 Drawing Sheets

HYDRAULIC SYSTEM FOR A MOTOR VEHICLE BRAKE SYSTEM HAVING A PUMP WITH PULSATION REDUCTION

BACKGROUND OF THE INVENTION

The invention is based on a hydraulic system as generically defined hereinafter. Such a system is already known (German Offenlegungsschrift 26 43 860, FIG. 4), in which a pulsating switchable magnet valve and a pump element ar provided for supplying pressure fluid to a wheel brake in a motor vehicle brake system with an anti-skid system. During an anti-skid control process, the magnet valve and the pump element are switched on, and because of their mode of operation they cause pressure fluctuations in the hydraulic system connected to them, which among other effects contribute to disruptive noise production. A damper chamber and a throttle body are therefore disposed downstream of the magnet valve, to reduce these pressure fluctuations caused by the switching of the magnet valve and the pulsating feeding of the pump element. For adequate effectiveness, however, it is necessary for the throttle bore of the throttle body to have a relatively small cross section, but this makes the hydraulic system very vulnerable to stoppage of the throttle bore from foreign bodies. Such malfunctions can cause pressures in the hydraulic system that cause rupture of the damper chamber housing or damage to the pressure generator.

OBJECT AND SUMMARY OF THE INVENTION

The hydraulic system according to the invention has the advantage over the prior art that an overload of the system in case of a malfunction is avoided in a simple manner, because an unallowable pressure rise causes rupture of the rupture disk, so that the pressure fluid can flow out of the damper chamber through an adequately large cross section. Although this cancels the damping action, nevertheless the hydraulic system otherwise continues to be functional. A motor vehicle brake system, for instance, thus remains effective; the price is simply a reduction in comfort during pump element operation because the audible operating noise is louder.

The feature of the invention defined herein is economical in terms of manufacture and assembly, because the two functional elements, the throttle bore and the rupture disk, are combined in one component.

The invention favors manufacture of the throttle body, preferably embodied as a lathe-turned part machined in a metal-cutting manner, which can be mounted in a simple manner in a cylindrical portion of the damper chamber to provide a friction-locking connection.

With the embodiment of the invention disclosed, manufacture, particularly if the throttle body is embodied as an extruded part, and assembly are again promoted.

With other provision, the effective area of the rupture disk is limited in a simple manner. Moreover, by making a notch, a sheared-off cross section of the rupture disk can be varied by varying the depth and/or diameter of the notch, to adapt the rupture disk to various rupture pressure requirements.

A further feature of the invention provides for retaining a burst rupture disk in a manner attainable at low production cost.

Other features increase the functional safety of the hydraulic system even after an overload of the rupture disk, because the disk is prevented from penetrating into elements of the system that follow the damper chamber.

Still another provision is a simple prevention for plugging of the throttle bore.

Yet other features of the invention defined herein are simple to achieve in manufacturing terms. Because of the fixed relationship between the screens and the throttle body, they are prevented from being mistaken for one another (when installed separately) in the damper chamber.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
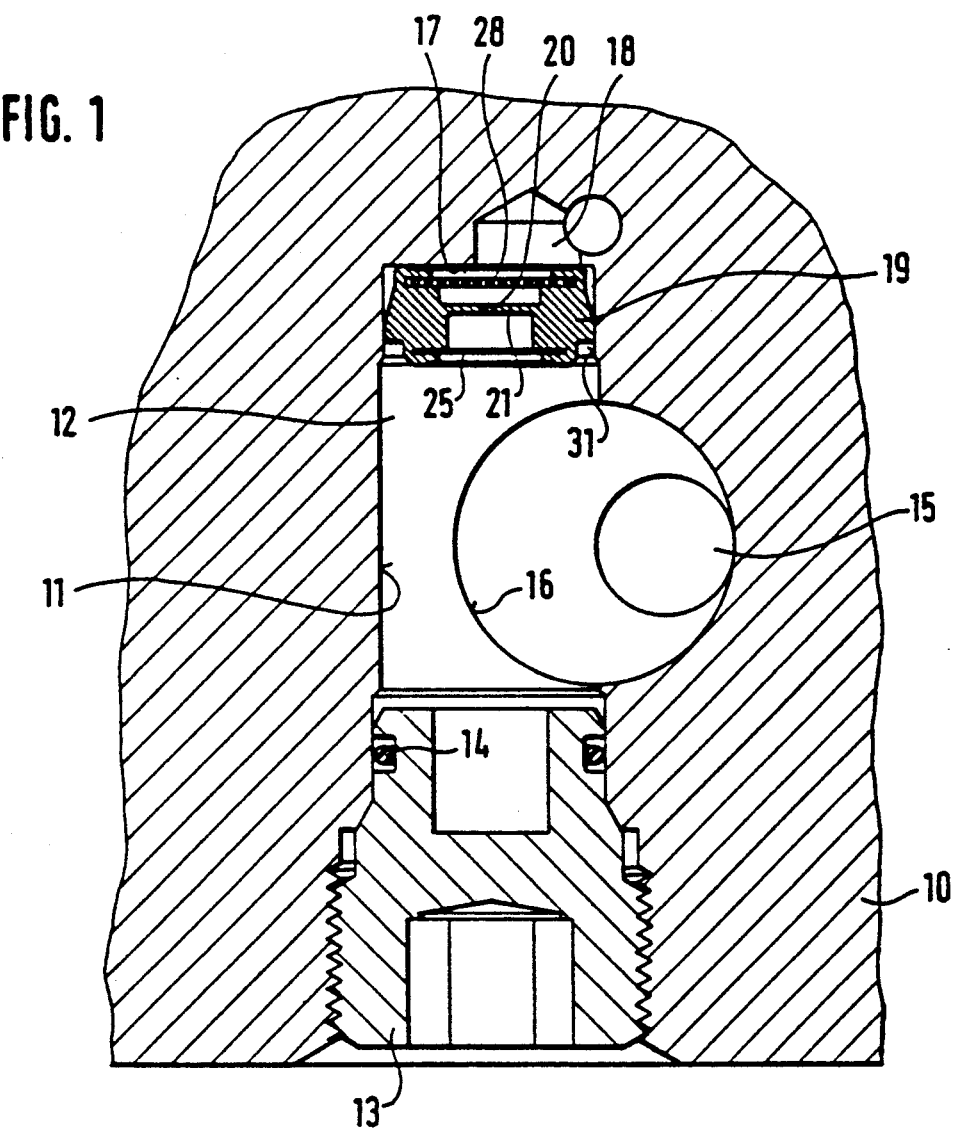
FIG. 1 is a longitudinal section through a damper chamber of a hydraulic system with a throttle body forming a first exemplary embodiment.

FIG. 1 of the drawing is a detail of a housing 10 of a hydraulic unit of a motor vehicle brake system, not otherwise shown, that forms a hydraulic system. A damper chamber 12 formed by a cylindrical bore 11 is disposed in the housing 10. The damper chamber is tightly closed off from the outside by a closure screw 13 with an inlaid sealing O-ring 14. On the inlet side, the damper chamber 12 communicates with a schematically shown piston pump 15 that pumps a hydraulic pressure fluid in a pulsating manner and the pump element (not shown) of which can be installed in a receiving bore 16 intersects the bore 11. On the output side, the damper chamber 12 communicates with other elements of the vehicle brake system, not shown, via a bore 18 beginning at the bore bottom 17 extending at right angles to the longitudinal axis of the bore 11. A throttle body 19 having a throttle bore 20 and a rupture disk 21 are disposed as a first exemplary embodiment at the outlet of the damper chamber 12.

Figure 2:
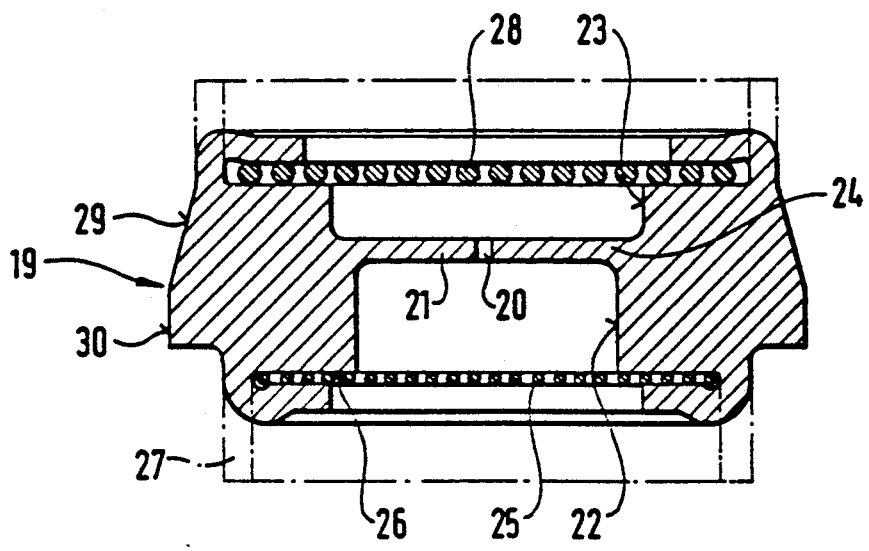
FIG. 2 is a longitudinal section through the throttle body with a throttle bore in a rupture disk, with screens disposed on either side of the disk, on a different scale from FIG. 1.

The throttle body 19 shown on a larger scale in FIG. 2 is of steel and takes the form of a rotationally symmetrical bush, preferably made as a lathe-turned part. The throttle body 19 has two turned recesses 22 and 23 beginning at its two face ends. The recesses are separated from one another by a thin-walled segment of the throttle body 19 which forms a transverse wall 24. The transverse wall 24 forms the parallel-defined circular rupture disk 21. Located in the middle of the transverse wall 24 is the throttle bore 20, extending coaxially with the longitudinal axis of the throttle body 19 and having a relatively small cross section.

On the inflow side, the throttle bore 20 is preceded by a filter screen 25, made of a fine-mesh wire cloth, received on the face end on the throttle body 19. The filter screen 25, which serves to intercept foreign bodies contained in the pressure fluid, has a mesh width that is preferably smaller than the diameter of the throttle bore 20. For holding the disk-like filter screen 25, the throttle bore 19 is made with a collar 27 (represented by dot-dash lines) that extends axially on the face end from a shoulder 26 defining the recess 22. After the filter screen 25 is placed in the throttle body 19, this collar 27 is folded over by crimping, and the screen is fixed in place along its rim.

In the region of its other face end, the throttle body 19 has a disk-like collecting screen 28, secured in the same manner, which is made from a wire cloth of relatively large wire diameter. This collecting screen 28 serves to retain the rupture disk 21, in the event that the disk has burst and sheared off in response to an unallowably high pressure rise in the damper chamber 12. The collecting screen 28 disposed downstream of the rupture disk 21 thus prevents further entrainment of the burst disk.

The throttle body 19 is provided on its periphery with an introduction incline 29 followed by a cylindrical jacket face 30. The introduction incline 29 makes it easier to introduce the throttle body 19 into the bore 11 of the damper chamber 12, while the cylindrical jacket face 30, with a cylindrical segment 31 of the bore 11 disposed near the bottom 17, serves to attain a friction-locking connection between the throttle body 19 and the housing 10. The press-fit depth of the throttle body 19 is defined by its being hammered onto the bottom 17 of the bore 11.

Figure 3:
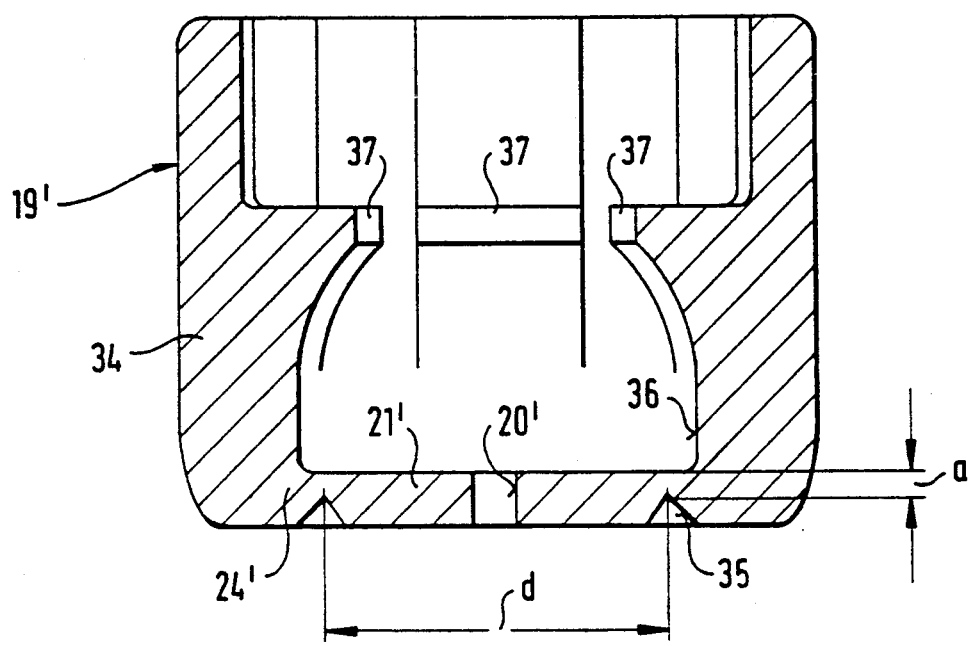
FIG. 3 shows a throttle body with a rupture disk, again in longitudinal section, as a second exemplary embodiment.
Figure 4:
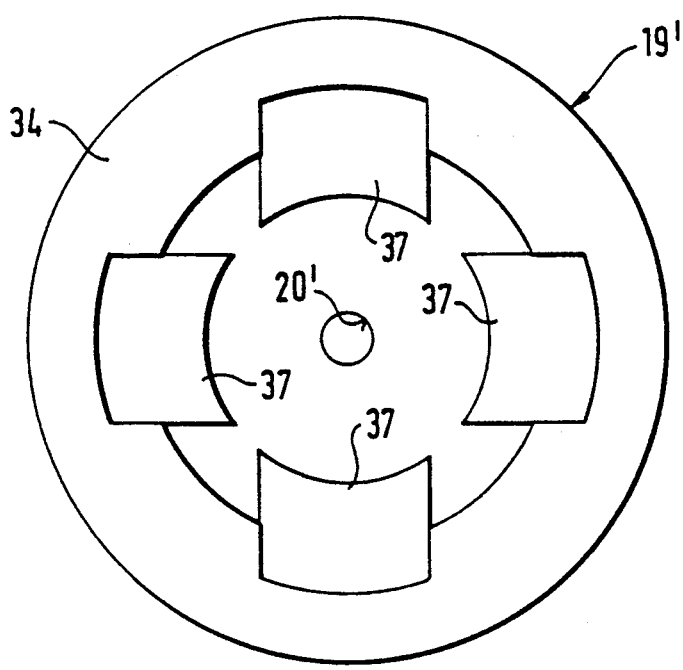
FIG. 4 is a view of the throttle body seen in the direction of the arrow IV in FIG. 3.

The throttle body 19' shown as a second exemplary embodiment in FIGS. 3 and 4 is cup-shaped. It has a hollow cylindrical jacket wall 34 for press-fit reception of the hydraulic unit housing 10 in the cylindrical portion 31 of the bore 11. Toward the bottom or in other words on the inflow side, the throttle body 19' has a transverse wall 24'. The thin-walled transverse wall 24' forms a rupture disk 21' with a throttle bore 20' disposed centrally in it. The operative area of the rupture disk 21' is defined by a notch 35 in the transverse wall 24', the notch extending circularly around it with a diameter d. The notch 35 made in the transverse wall 24' from its free face end reduces the thickness of the transverse wall at the periphery of the rupture disk 21' to a remaining thickness a, by which the sheared-off cross-sectional area of the rupture disk, which is definitive for the rates rupture pressure, is defined. Throttle bodies 19' of identical form can therefore be adjusted for various rupture pressures by varying the depth to which the notch is made. Moreover, the operative area of the rupture disk 21', which is defined by the tip of the notch 35 of triangular cross section, can be varied by varying the diameter d.

The throttle body 19' can preferably be made as an extruded part. In the region of its jacket wall 34, it has an inner circular-cylindrical circumferential face 36, from which four radially oriented protrusions 37 project. The protrusions 37 are made by a cross-shaped impressing stamp, not shown, which engages the jacket wall 34 from the side remote from the transverse wall, by plastic deformation of the throttle body 19'. The nose-like protrusions 37 reduce the downstream inside cross section of the throttle body 19' to such an extent that a burst or, in other words sheared-off, rupture disk 21' is retained within the throttle body.

The foregoing relates to a preferred exemplary embodiment of the invention, it being understood that other variants and embodiments thereof ar possible within the spirit and scope of the invention, the latter being defined by the appended claims.

What is claimed and desired to be secured by Letters Patent of the United States is:

1. A hydraulic system, for a motor vehicle brake system, having a pulsating feeding pressure generator (15), having a damper chamber (12) disposed downstream of the pulsating feeding pressure generator in a housing (10), a throttle body (19) having a rupture disk (21) with a throttle bore (20) is received in said damper chamber (12), said throttle bore communicates with an outlet bore (18) which is associated with the damper chamber (12), and said rupture disk (21) is followed on a downstream side by a collection screen (28).

2. A hydraulic system as defined by claim 1, in which the rupture disk (21) of said throttle body (19) has a thin-walled portion in which the throttle bore (20) is disposed.

3. A hydraulic system as defined by claim 2, having a cylindrical portion (31) on an outlet side of the damper chamber 912), in which the throttle body (19) has a form of a bushing, said throttle body is received with a press fit in the cylindrical portion (31) of the damper chamber (12), and that a transverse wall (24) of the bushing forms the rupture disk (21).

4. A hydraulic system as defined by claim 3, in which the throttle bore (20) is preceded on an inflow side by a filter screen (25).

5. A hydraulic system as defined by claim 4, in which disk-shaped screens (25, 28) are crimped into the throttle body (19) on an end face of said disk-shaped screens along their rim.

6. A hydraulic system as defined by claim 3, in which an operative face of the rupture disk (21') is defined by an encompassing notch (35) in the transverse wall (24').

7. A hydraulic system as defined by claim 3, in which disk-shaped screens (25, 28) are crimped into the throttle body (19) on an end face of said disk-shaped screens along their rim.

8. A hydraulic system as defined by claim 2, having a cylindrical portion (31) on an outlet side of the damper chamber (12), in which the throttle body (19') is cup-shaped and with a jacket wall (34) is received with a press-fit in the cylindrical portion (31) of the damper chamber (12), and that a transverse wall (24') toward a bottom forms the rupture disk (21').

9. A hydraulic system as defined by claim 8, in which an operative face of the rupture disk (21') is defined by an encompassing notch (35) in the transverse wall (24').

10. A hydraulic system as defined by claim 8, in which the throttle body (19') is reduced in an inside cross section on a downstream side of the throttle bore (20'), by means of protrusions (37) extending radially inward from the jacket wall (34).

11. A hydraulic system as defined by claim 8, in which the throttle bore (20) is preceded on an inflow side by a filter screen (25).

12. A hydraulic system as defined by claim 11, in which disk-shaped screens (25, 28) are crimped into the throttle body (19) on an end face of said disk-shaped screens along their rim.

13. A hydraulic system as defined by claim 2, in which disk-shaped screens (25, 28) are crimped into the throttle body (19) on an end face of said disk-shaped screens along their rim.

14. A hydraulic system as defined by claim 1, in which the throttle bore (20) is preceded on an inflow side by a filter screen (25).

15. A hydraulic system as defined by claim 14, in which disk-shaped screens (25, 28) are crimped into the throttle body (19) on an end face of said disk-shaped screens along their rim.

16. A hydraulic system as defined by claim 1, in which disk-shaped screens (25, 28) are crimped into the throttle body (19) on an end face of said disk-shaped screens along their rim.

* * * * *